(12) United States Patent
Moradnia

(10) Patent No.: US 11,840,400 B2
(45) Date of Patent: Dec. 12, 2023

(54) MODULAR AUTONOMOUS VEHICLES

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 17/196,248

(22) Filed: Mar. 9, 2021

(65) Prior Publication Data
US 2022/0289478 A1    Sep. 15, 2022

(51) Int. Cl.
B65G 1/04    (2006.01)

(52) U.S. Cl.
CPC ................... B65G 1/0492 (2013.01)

(58) Field of Classification Search
CPC .................................. B65G 1/0492
See application file for complete search history.

(56) References Cited

U.S. PATENT DOCUMENTS

| | | | |
|---|---|---|---|
| 5,456,332 A | * | 10/1995 | Borenstein ........... G05D 1/0272 180/22 |
| 8,540,272 B1 | | 9/2013 | Vitale et al. |
| 9,592,724 B1 | | 3/2017 | Trujillo et al. |
| 10,603,997 B2 | | 3/2020 | Bergstrom et al. |
| 11,110,593 B2 | * | 9/2021 | Tarbaieva ........... B65G 1/0464 |
| 2009/0236877 A1 | | 9/2009 | Peschansky et al. |
| 2016/0257361 A1 | | 9/2016 | Habernegg |
| 2019/0308856 A1 | * | 10/2019 | Wright ............... B66F 9/07581 |

FOREIGN PATENT DOCUMENTS

| | | |
|---|---|---|
| CN | 208855774 U | 5/2019 |
| CN | 211592704 U | 9/2020 |
| EP | 3667583 A1 | 6/2020 |
| WO | 2020214031 A1 | 10/2020 |

* cited by examiner

*Primary Examiner* — Saul Rodriguez
*Assistant Examiner* — Willie W Berry, Jr.
(74) *Attorney, Agent, or Firm* — Plumsea Law Group, LLC

(57) ABSTRACT

Autonomous vehicle (AV) systems are disclosed that may be deployed as a single vehicular unit or multiple units that operate synchronously. An AV system may deploy a flexible and scalable number of autonomous vehicles of different sizes, capacities, and propulsion systems that either transport smaller or lighter goods alone or connect with other vehicular units to form a larger, higher capacity vehicle. Each of these units is configured to navigate independently, as well as synchronously with companion units. For example, a unit may be paired with one, two, or three or more other units to provide greater capacity in which to carry goods.

20 Claims, 14 Drawing Sheets

MODULAR AUTONOMOUS VEHICLES

BACKGROUND

The present disclosure generally relates to driverless vehicles and, more particularly, to autonomous vehicles that can include modular components and work synchronously with other autonomous vehicles to provide a flexible load capacity.

Automated vehicles are becoming integral parts of warehouses and distributions centers. In 2018, the warehouse automation market grew by more than 13% globally to record sales in excess of USD 12.5 billion. Warehouses are experiencing a continuous increase in investment, driven by increasing levels of automation within the warehouse as well as the integration of supply chains. However, most self-driving vehicles are limited in their functionality. For example, an autonomous vehicle may be designed and used for a specific task, but when the same vehicle is directed to a different task, it may not perform as well. In addition, such vehicles are constrained by their fixed size and structure, restricting both their load capacity as well as their ability to perform in a variety of operating conditions. Thus, a user may need to obtain a larger number and variety of these vehicles in order to have access to all of the features needed for their organization.

There is a need in the art for a system that expands the limited performance of individual autonomous vehicles and allows for convenient and straightforward flexibility in their day-to-day use.

SUMMARY

The disclosed embodiments provide methods and systems for a modular and scalable automated vehicle transporting arrangement.

In one aspect, a modular driverless vehicle system comprises a first vehicular unit including a first chassis with a first propulsion system, and a first control unit. The system also comprises a second vehicular unit that includes a second chassis with a second propulsion system, and a second control unit. The first vehicular unit and second vehicular unit are configured to operate synchronously, and automatically maintain a substantially constant distance between the first vehicular unit and the second vehicular unit during operation.

Another aspect provides a kit of parts comprising a first vehicle comprising a first chassis with a first wheeled assembly and a first control unit, and a second vehicle comprising a second chassis with a first tracked assembly and a second control unit. The kit also includes a first sidewall that is configured to be removably fastened to either or both of the first chassis or the second chassis.

Another aspect provides an autonomous modular vehicular unit. The vehicular unit includes a first chassis with a first propulsion system, and a control unit configured to communicate with a remote operator. The vehicular unit also includes a first platform removably mounted on a first side of the first chassis.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
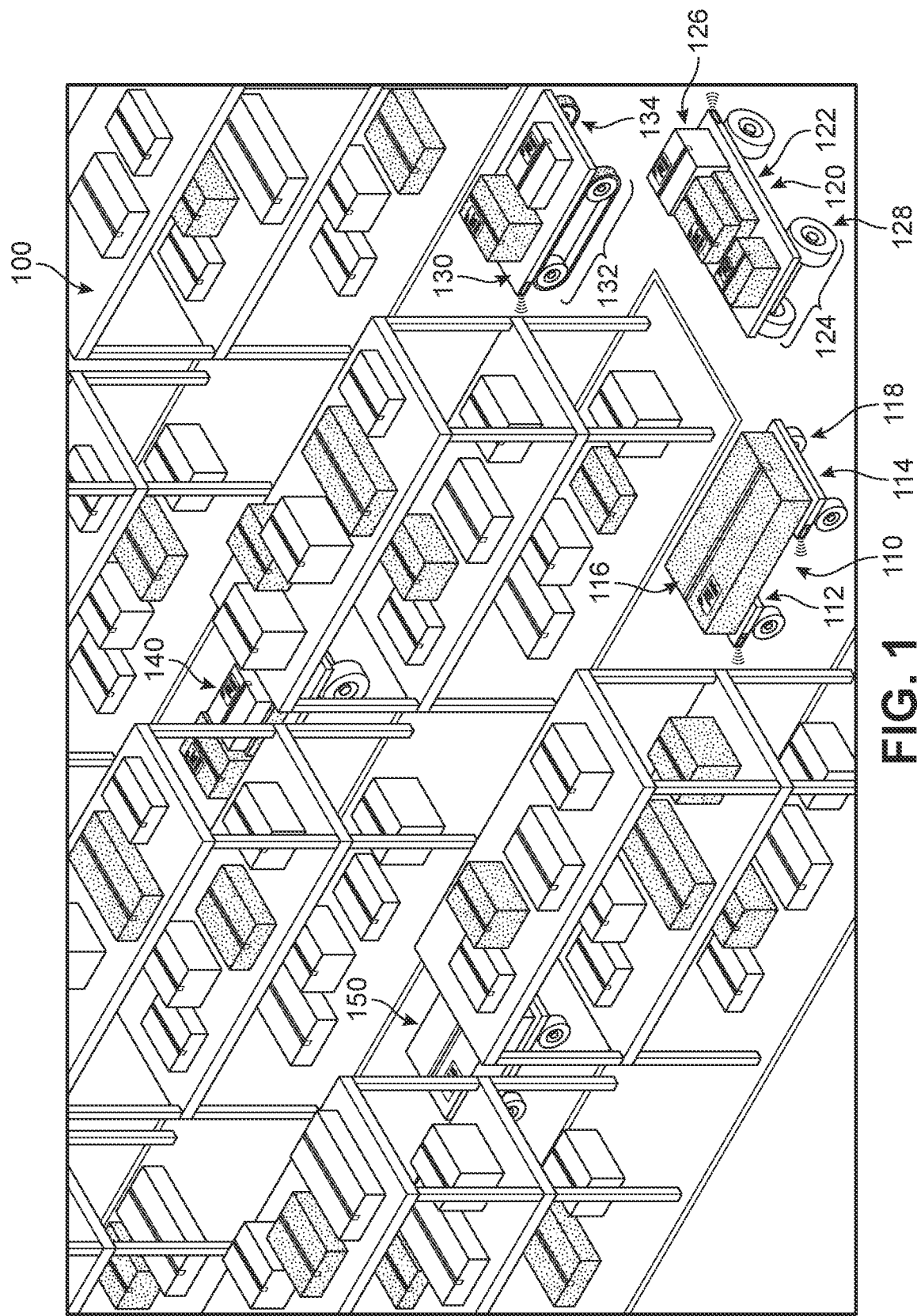
FIG. 1 presents an example of a number of autonomous vehicles deployed in a warehouse site, according to an embodiment.

Vehicle automation technology is increasingly applied in practice to execute material handling tasks in harbors, airports, warehouses, and other logistics yards. Material-handling performance is crucial for the competitiveness of such entities and sites, where the transportation of goods is completed as quickly and as efficiently as possible. Vehicle automation technology can reduce or even eliminate human error, is highly reliable and accurate, allows for the continuous monitoring of goods and vehicles, and decreases labor costs. However, the penetration of automated vehicle systems in the market has been impaired by the difficulty of developing a system that is sufficiently generic so as to be applied to a wide range of logistical settings and tasks. There are currently no "off-the shelf" solutions in warehouse automation. Rather, each system is customized to the individual customer's business needs. The system a retailer or other user selects will depend in part on the level of organizational flexibility desired for a particular warehouse or other logistical area.

As will be discussed in detail below, the proposed systems offer a modular, scalable, accessible, and simplified automated vehicle transporting mechanism. The systems, being modular, are not tied to the physical infrastructure of the warehouse or other location. More specifically, in some embodiments, an autonomous vehicle (AV) system can be deployed as a single 'cart' or unit, while in other embodiments, the AV system can include multiple units that operate synchronously to perform as a single combined vehicle. Thus, in different embodiments, an AV system may deploy a flexible and scalable number of autonomous vehicles of different sizes, capacities, and propulsion systems that either transport smaller or lighter goods alone or connect with other vehicle units to form a larger, higher capacity vehicle.

Furthermore, each of these units is configured to navigate independently, as well as synchronously with companion units. For example, a unit may be paired with one, two, or three or more other units to provide a larger platform upon which to carry goods. In addition, while in some embodiments, the units can be configured as open-bed transporters, in other embodiments, one or more modular sidewalls can be mounted onto the units to provide additional security and stability, as well as protection from the surrounding environment. These adjustments, being dependent on the units' ability to work as a collective entity when needed, do not involve costly reconfigurations or complex assembly and reassembly to switch between single unit vehicles to multi-unit vehicles. Thus, the proposed systems offer more flexibility when it comes to handling disparities in size, shape, weight, volume and mechanical properties of the goods. The systems also offer more flexibility in adapting to changes requiring a new site layout, eliminating burdensome retrofitting. Furthermore, the proposed systems facilitate scalability in order to adapt to growth and cope with seasonal demand or other changes.

For purposes of introduction, an overview of one embodiment of the proposed systems and methods is illustrated with reference to FIG. 1. In this example, a warehouse location ("warehouse") 100 is depicted in which an AV system or kit in accordance with an exemplary embodiment of the disclosure herein is shown. As illustrated, the AV system includes a first AV 110, a second AV 120, a third AV 130, a fourth AV 140, and a fifth AV 150. As will be discussed in greater detail below, AVs can comprise one or more vehicular units. More specifically, the first AV 110 comprises a first vehicular unit 112 and a second vehicular unit 114 that are operating synchronously in order to carry and transport a first package 116. The second AV 120 comprises a single, third vehicular unit 122 carrying and transporting a set of boxes 126. Both first AV 110 and second AV 120 operate with a wheeled propulsion system. In this case, first vehicular unit 112 provides the front wheels and second vehicular unit 114 provides the rear wheels for first AV 110, while third vehicular unit 122 provides both front and rear wheels for second AV 120. In addition, in some embodiments, the wheels included in an AV can be modified or selected based on the task for which the AV is being used, and/or the desired height of the unit's chassis. For example, first AV 110 includes smaller wheels 118 than the larger wheels 128 of second AV 120. In addition, the units may employ different types of propulsion systems. In this case, third AV 130 includes a tracked propulsion system 134 comprising a pair of tracks 132, each track being independent to enable steering. Additional AVs, such as fourth AV 140 and fifth AV 150, are also shown moving through the aisles of warehouse 100.

As a general matter, autonomous vehicles herein refer to unmanned devices which have a drive means or propulsion means in order to move the autonomous device ("self-propelled"), an onboard energy reservoir to power the propulsion means, and a chassis. In some embodiments, the AV also includes one or more sensors and a control means functionally connected to the sensor(s) and the drive means. The AV navigates in a free manner that can occur without human support based on sensor data acquired by one or more sensor(s) and processed in the control means in order to generate control signals for the propulsion means. In other embodiments, the AV can receive remote command signals from a human operator or other centralized coordinator control module.

In different embodiments, the AVs can be, for example, a two-wheeled, four-wheeled, six-wheeled, or more vehicle and/or a continuous track vehicle. In some embodiments, the AV may include an internal combustion engine such as a diesel engine or a gasoline engine as a power source, an electric AV including an electric motor as a power source, a hybrid AV including both of an internal combustion engine and an electric motor, or the like. The electric AV, for example, is driven using electric power discharged by a battery, such as a secondary battery, a hydrogen fuel cell, a metal fuel cell, or an alcohol fuel cell.

Furthermore, for purposes of this application, a modular vehicle is one in which substantial components of the vehicle are interchangeable. This modularity is intended to make repairs and maintenance easier, and to allow the vehicle to be reconfigured to suit different functions. As will be discussed below, the proposed embodiments offer a high degree of modularity whereby there is a ready and simple process for the exchange of components such as batteries, sidewalls, chassis, propulsion systems, unit length, sensors, etc., as well as the capacity to modify the vehicle's arrangement itself. In a modular AV of the proposed embodiments, the power system and energy module, wheels and/or tracks, and suspension can be contained in or connected to a single module or chassis.

In addition, in different embodiments, the AVs described herein include a vehicle control system, typically disposed in or connected to the chassis. The vehicle control system is realized by, for example, one or more processors or hardware having equivalent functions. The vehicle control system may have a configuration in which a processor such as a central processing unit (CPU), a data storage device, an electronic control unit (ECU) in which a communication interface is connected by an internal bus, a micro-processing unit (MPU), and the like are combined. In some embodiments, the vehicle control system can include components and modules configured to enable the AV to operate autonomously. As some non-limiting examples, the vehicle control system might include a target lane determination module, an automated driving control module, a travel control module, a human-machine interface (HMI) control module, and/or a storage module. The automated driving control module could include, for example, an automated driving mode control module, a vehicle position recognition module, an external environment recognition module, an action plan generation module, a trajectory generation module, and/or a switching control module. Each module can be realized or implemented by the processor executing a program (software). Further, some or all of these may be realized by hardware such as a large-scale integration (LSI) or an application specific integrated circuit (ASIC) or may be realized by a combination of software and hardware. In some embodiments, information such as map information, target lane information, action planning information, and HMI control can be stored in the storage module. The program executed by the processor may be stored in the storage module in advance, or may be downloaded from an external device via a communications module.

In addition, in some embodiments, road information, traffic regulations information, address information (address and postal code), facilities information, telephone number information, or the like may be included in the storage module. The road information includes information indicating a type of road, such as highways, toll roads, national roads, and prefectural roads, the number of lanes of roads, a width of each lane, a gradient of the road, a position of the road (three-dimensional coordinates including longitude, latitude, and height), curvatures of curves of lanes, positions of merging and branching points of a lane, or information on signs or the like provided on a road.

In different embodiments, the vehicle control system may also include or be connected to a navigation module that enables access to, for example, a global navigation satellite system (GNSS) receiver or map information (navigation map) in order to allow the AV to derive a route from its current position to a destination as might be designated by a user. In some embodiments, instructions may be provided to the navigation module by a remote device such as a smartphone or a tablet carried by an operator. In such cases, transmission and reception of information are performed by wireless or wired communication between the remote device and the vehicle control system via a communication module. The communication module is configured to perform, for example, wireless communication using a cellular network, a Wi-Fi network, Bluetooth™, dedicated short range communication (DSRC), or the like. The communication module also provides each vehicular unit with the capability of communicating with other vehicular units, particularly when serving together as a single (amalgamated) autonomous vehicle (e.g., see FIG. 3). In some embodiments, the communication module can acquire, for example, traffic information, weather information, or the like from an external device connected by wireless communication.

Although not depicted in the drawings, it should be understood that in different embodiments, each vehicular unit can include one or more sensors such as but not limited to finders, radars, and cameras/imaging devices. The finders are, for example, LIDARs (light detection and ranging or laser imaging detection and ranging) that measure scattered light with respect to irradiation light and measure a distance to a target. For example, a finder can be attached to a front or rear of the chassis, to a side of a chassis or wheels or tracks, on a sidewall, etc. The radars are, for example, long-distance millimeter wave radars or medium-distance millimeter wave radars. The radars may detect, for example, an object using a frequency modulated continuous wave (FM-CW) scheme. A camera may comprise, for example, a digital camera or other imaging sensor. The camera may be a stereo camera including a plurality of cameras. In some embodiments, sensors include a vehicle speed sensor that detects a vehicle speed (traveling speed), an acceleration sensor that detects an acceleration, a yaw rate sensor that detects an angular velocity around a vertical axis, an azimuth sensor that detects a direction of the unit, and the like.

Those skilled in the art will appreciate that a variety of sensors may be used in the system. Such sensor devices may be used to determine the vehicle's attitude, position, heading, velocity, location, acceleration, operation history, and the like. Sensor systems may also be used to sense objects around the vehicle, such as other vehicles, pedestrians, bicyclists, buildings, traffic signs, traffic lights, intersections, bridges, and the like. Those skilled in the art will appreciate that a multitude of other sensors could be used and the embodiments are not limited to the listed sensors. This description is merely an example, and parts of the configuration may be omitted or other configurations may be added.

Figure 2A:
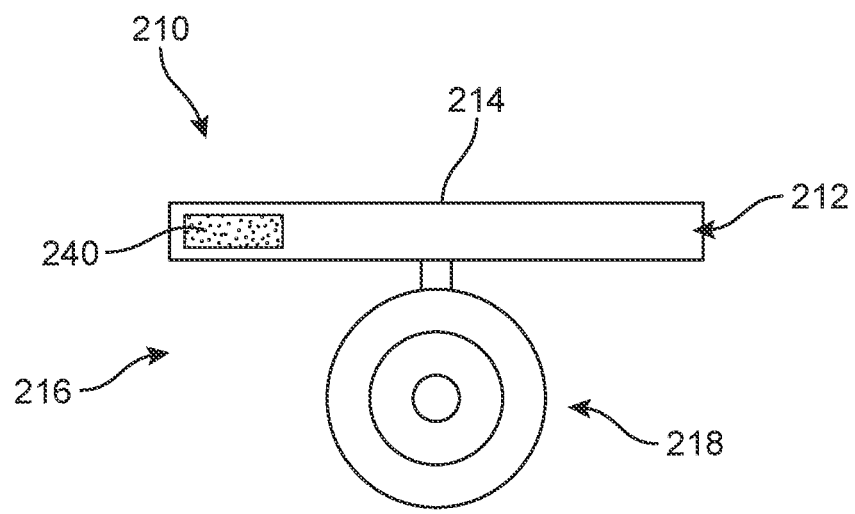
FIG. 2A is a schematic side view of an autonomous wheeled vehicle with a single axle and FIG. 2B is a schematic side views of an autonomous tracked vehicle, according to an embodiment.
Figure 2B:
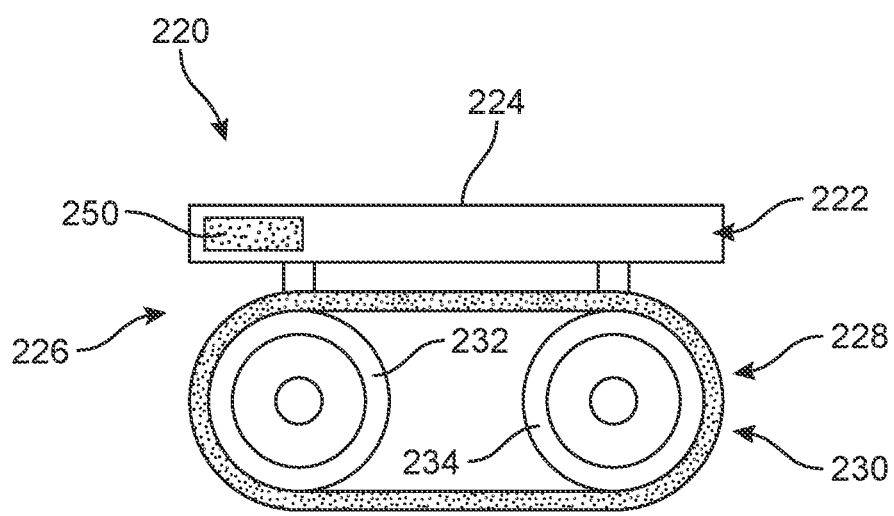

FIGS. 2A and 2B present two examples of a vehicular unit of the proposed AV systems. In general, as noted above, in different embodiments, an autonomous vehicle (also referred to as simply "vehicle") is equipped with at least a chassis, a propulsion system, and a power system, where the chassis includes or is connected to a vehicle control system. As a general matter, a propulsion system refers to the mechanical propelling source for the vehicle, such as an engine or motor, as well as some means of using this power to generate force. In different embodiments, the proposed systems encompass two such means, including wheel and axles and continuous ("caterpillar") track, as depicted in FIGS. 2A and 2B, which represent two examples of basic modular "building blocks" or vehicular units ("units") for the AV system.

In FIG. 2A, a conceptual side view of a first unit 210 is presented. The first unit 210 includes a wheeled assembly 218 comprising an axle with a pair (left and right) of wheels, where only one wheel of the two wheels is visible in this view. The wheel assembly 218 supports a first chassis 212 above a ground surface so as to be capable of travel. In some embodiments, the wheeled assembly 218 is rotatably fastened to the underside of the first chassis 212. In addition, a first vehicle control system ("first control system") 240 is connected to the first chassis 212. The first control system 240 is shown as integrated into a forward end of first chassis 212, but in other embodiments the position of first control system 240 can vary. In one embodiment, the first control system 240 is a removable component that can be connected or plugged into the chassis, and is interchangeable with other modular control systems that may be provided in the AV system.

The first chassis 212 can include an upper surface 214 that is configured to receive or hold various items or objects for transport. The upper surface 214 of any of the chassis presented herein may be substantially smooth and continuous platform, or may include texturing, segmented regions, pockets, recesses, compartments, etc. that can be directed toward the transport of specific types of goods. In one embodiment, the upper surface of a chassis can simply comprise a frame with a hollow interior, allowing the user to select one or more modular platforms to interchange and install on the chassis. Furthermore, in some embodiments, the chassis can include a mounting mechanism or hook(s) that facilitate the attachment of straps or other securing means. As will be discussed below, in some embodiments, the chassis in any of the embodiments presented herein can include grooves and/or fastening mechanisms along its perimeter to facilitate the mounting of sidewalls to the vehicle.

In FIG. 2B, a conceptual side view of a second unit 220 is presented. The second unit 220 includes a pair of continuous bands of treads or track plates driven by two wheels. For example, the band can be made of modular steel plates or synthetic rubber reinforced with steel wires, or other such tracked mechanisms. In FIG. 2B, the second unit 220 comprises a first tracked assembly 228 that includes a right track mechanism and a left track mechanism (only one track mechanism of the two track mechanisms is visible in this view) that support a second chassis 222 above a ground surface so as to be capable of travel. In some embodiments, each track mechanism includes at least a forward wheel 232 and a rear wheel 234 that drive a continuous band 230. In addition, a second vehicle control system ("second control system") 250 is connected to the second chassis 222, as discussed above with respect to first control system 240. The second chassis 222 can include an upper surface 224 that is configured to receive or hold various items or objects for transport, as noted above with respect to first chassis 212. In addition, it can be appreciated that second unit 220 may operate by itself as an autonomous vehicle, while first unit 210 would typically require at least one additional unit ("co-unit") to operate as an autonomous vehicle.

For purposes of this disclosure, vehicular units employing a wheeled-based propulsion system will be understood to include a first type of propulsion system or a wheeled propulsion system 216. Vehicular units employing a continuous track-based propulsion system will be understood to include a second type of propulsion system or a tracked propulsion system 226. In general, wheeled propulsion systems ("wheeled systems" or "wheeled vehicles") typically offer greater maneuverability, and are more lightweight, lower in cost, and have fewer components that can be damaged. Tracked propulsion systems ("tracked systems" or "tracked vehicles") have a larger surface area that distributes the weight of the vehicle better than standard tires on an equivalent vehicle, enabling the continuous tracked vehicle to traverse soft ground with less likelihood of becoming stuck (e.g., due to sinking) and can support more weight as it is spread over the entire surface of the track. Tracked systems also generally have better traction and function better on rough or uneven terrain. The treads are also hard-wearing and damage resistant, especially in comparison to rubber tires. A typical tracked assembly might include a caterpillar-type drive and a peripheral ground-engagement part comprising an endless belt mounted on at least two wheels. Thus, each of the units shown in FIGS. 2A and 2B offer distinct features and capabilities that may be desired by an end-user.

Figure 3:
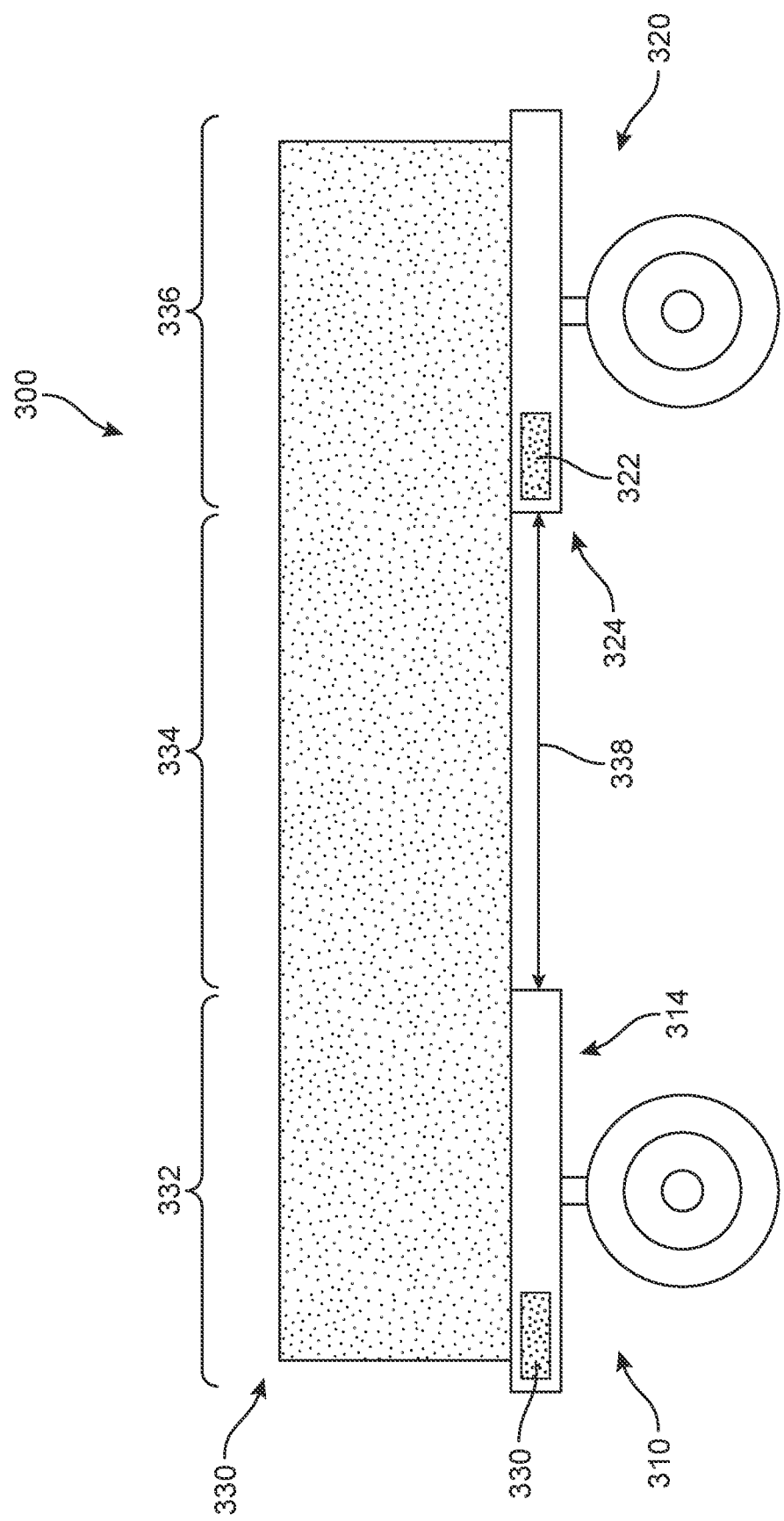
FIG. 3 is a side view of a first type of driverless vehicle system comprising two autonomous synchronized wheeled vehicles, according to an embodiment.

As noted above, in different embodiments, the proposed AVs can include two or more units that can operate in concert, and/or with additional wheeled or tracked assemblies. Some of these embodiments will now be discussed with reference to FIGS. 3-5 below. In FIG. 3, a conceptual side view of a first autonomous vehicle ("first vehicle") 300 is depicted comprising two vehicular units that are wirelessly linked. Both of the units, here labeled as a third unit 310 and a fourth unit 320, can be understood to correspond to the vehicular unit described above as first unit 210 shown in FIG. 2A (comprising the wheeled propulsion system). However, in other examples, the two units may alternatively correspond to the vehicular unit described as second unit 220 in FIG. 2B, while in yet another example, one unit may correspond to first unit 210 (FIG. 2A) and the other unit to second unit 220 (FIG. 2B) (providing a mixed propulsion system). In this case, the two units are spaced apart by a first distance 338. The first distance 338 can vary widely, and be selected by the operator. Thus, in other embodiments, the two units may be disposed directly adjacent to one another, while in some other embodiments the two units may be hundreds of feet or more apart.

In this example, a first object 330 having a substantially elongated body including a first portion 332, a second portion 338, and a third portion 336 is depicted as being loaded onto first vehicle 300. Because first vehicle 300 comprises two spaced apart units, while first portion 332 rests on a third chassis 314 and third portion 336 rests on a fourth chassis 324, the intermediate second portion 334 is actually exposed or remains unsupported. Thus, such an arrangement is typically preferable in cases where a single elongated object with a substantially even or uniform distribution of weight is to be transported. However, in other cases, a modular platform may be laid across and removably fastened to the chassis of two of more units, forming a bridge across the gap(s) that allows for the secure placement of multiple objects.

Figure 4:
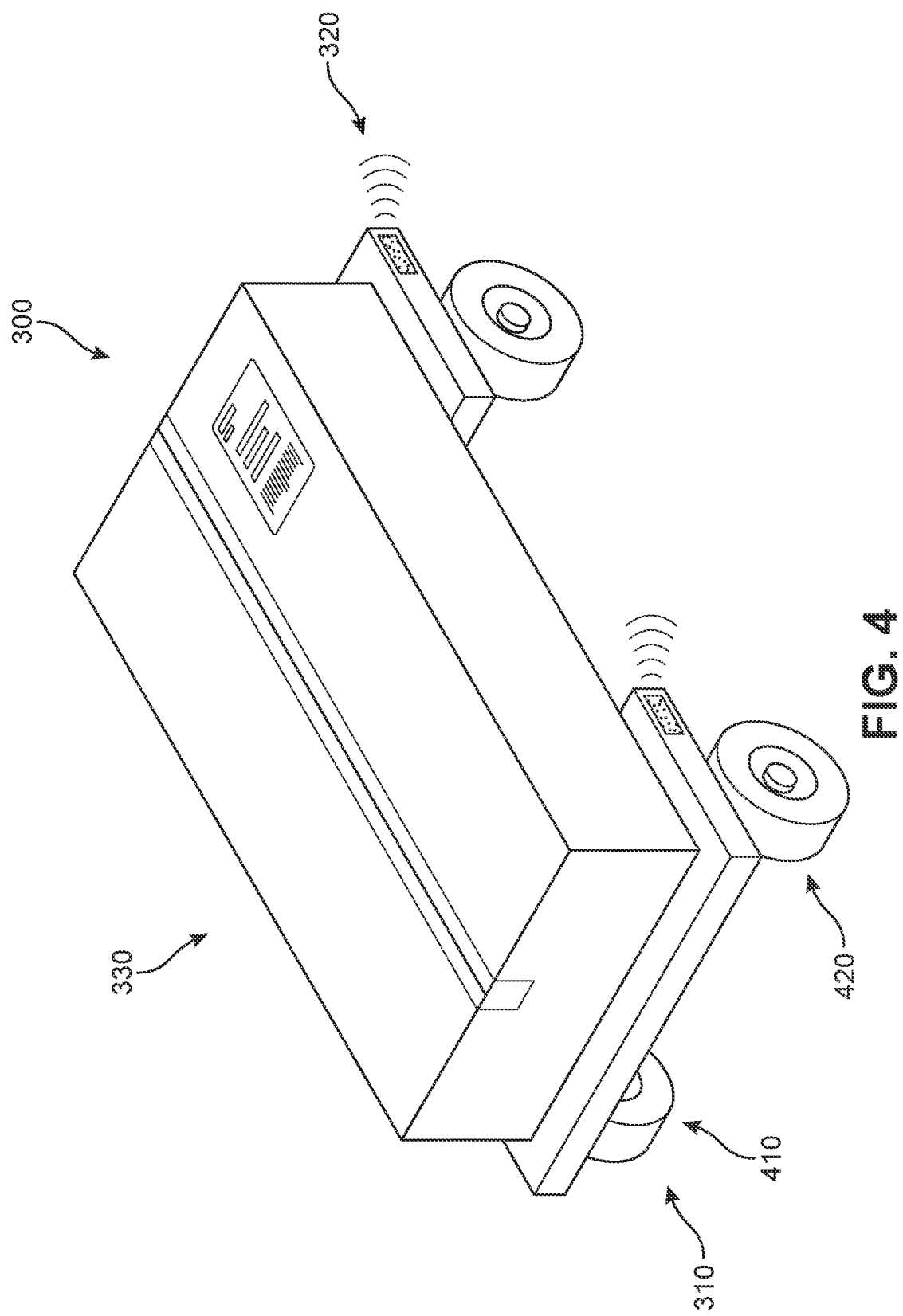
FIG. 4 is an isometric side view of the first type of driverless vehicle system, according to an embodiment.

In addition, in order to operate synchronously, a third control system 312 disposed in third chassis 314 and a fourth control system 322 disposed in fourth chassis 324 are configured to communicate with one another and a remote operator, and employ a plurality of sensors to maintain a stable, steady motion relative to one another and/or a substantially constant distance (as selected by the remote operator or according to a default distance setting) between the units/carts. In other words, the units will operate in a substantially synchronous arrangement, where each unit will work with other unit(s) comprising the vehicle to operate at generally the same speed at the same time, and in the same direction, and/or collectively perform other driving maneuvers in a highly coordinated process. For example, the individual units of a multi-unit AV will accelerate and decelerate in concert. The term synchronous should therefore be understood to refer two to or more units that work in concert to perform particular functions and effectively operate as a single vehicular entity. Thus, while the two units are discrete and separate, for all intents and purposes they operate cooperatively as if they were comprising a single vehicle or were otherwise mechanically connected. For purposes of clarity, an isometric view of the third vehicle 300 is shown in FIG. 4. In this view, a first wheel (left wheel) 410 and second wheel (right wheel) 420 of the third unit 310 can be seen.

Figure 5:
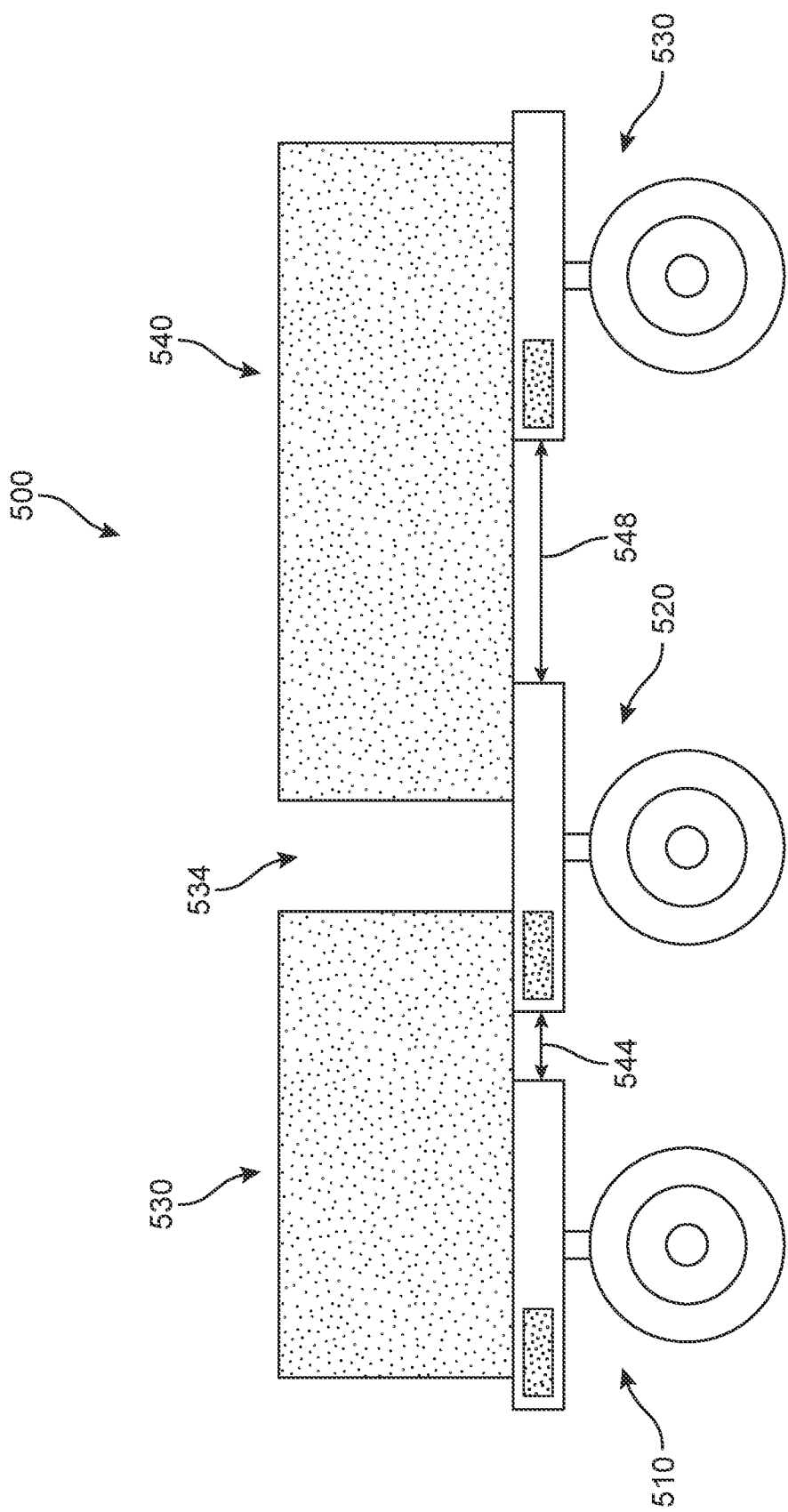
FIG. 5 is a side view of a second type of synchronous driverless vehicle system comprising three autonomous synchronized wheeled vehicles, according to an embodiment.

Referring now to FIG. 5, another embodiment is presented in which a second autonomous vehicle ("second vehicle") 500 is depicted comprising three vehicular units that are wirelessly linked. All three of the units, here labeled as a fifth unit 510, a sixth unit 520, and a seventh unit 530, can be understood to correspond to the vehicular unit described above as first unit 210 shown in FIG. 2A (comprising the wheeled propulsion system). However, in other examples, the three units may alternatively correspond to the vehicular unit described as second unit 220 in FIG. 2B, while in yet another example, one or two units may correspond to first unit 210 (FIG. 2A) and the other unit(s) to second unit 220 (FIG. 2B) (providing a mixed propulsion system). In this case, the fifth unit 510 and sixth unit 520 are spaced apart by a second distance 544, and the sixth unit 520 and seventh unit 530 are spaced apart by a third distance 548. In different embodiments, each distance can vary widely, and be selected by the operator. In this example, the second distance 544 is smaller than the third distance 548. In other embodiments, the three units may be disposed directly adjacent to one another, while in some other embodiments the two units may be several feet or more apart.

In FIG. 5, a second object 530 and a third object 540 are loaded onto second vehicle 500, where second object 530 rests on both fifth unit 510 and sixth unit 520, and third object 540 rests on both sixth unit 520 and seventh unit 530. With the additional distance provided between sixth unit 520 and seventh unit 530, the longer length of third object 540 (relative to the shorter second object 530) is readily accommodated. In some embodiments, this type of arrangement (three units) can also be used to carry long loads like the first object 330 of FIG. 3 that are heavier than first object 330, with the additional axle offering greater support and distribution of weight. In addition, as described earlier, in order to operate synchronously, each of the three units has an independent control system that is configured to communicate with other units comprising the same vehicle, as well as process sensor data from one or more sensors installed in each chassis and transmit/receive data from a remote operator.

Figure 6:
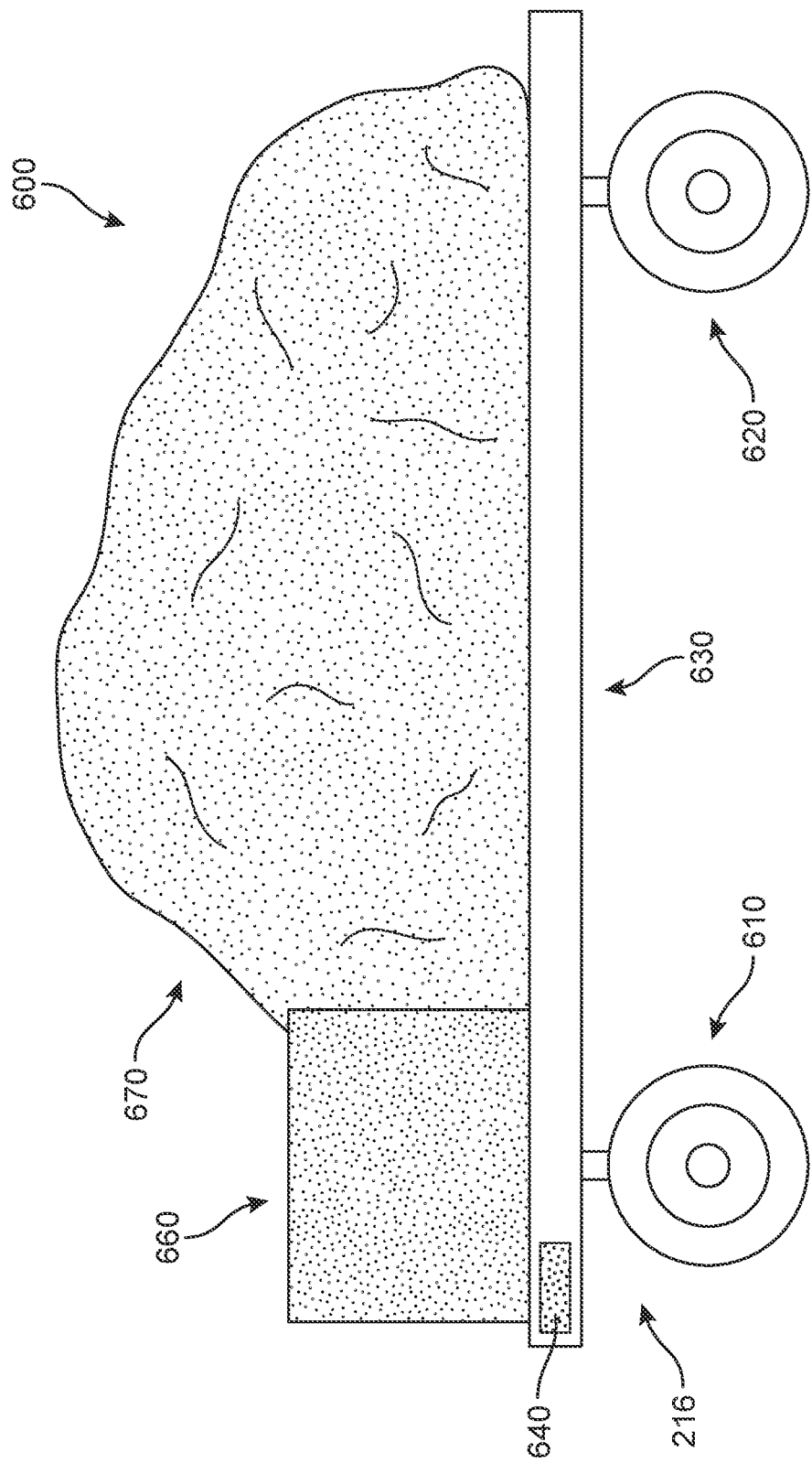
FIG. 6 is a side view of a third type of driverless vehicle system comprising a single autonomous wheeled vehicle with two axles, according to an embodiment.

Referring now to FIG. 6, another embodiment is presented in which a third autonomous vehicle ("third vehicle") 600 is depicted comprising a single vehicular unit with two wheeled assemblies, here shown as a first wheeled assembly 610 and a second wheeled assembly 620, each employing wheeled propulsion system 216. The first wheeled assembly 610 is disposed toward one end of the vehicle and the second wheeled assembly 620 is disposed toward the opposing end. However, in other examples, the two wheel sets may alternatively be replaced with two tracked assemblies as described with reference to second unit 220 in FIG. 2B, while in yet another example, one assembly may correspond to the wheeled assembly of first unit 210 (FIG. 2A) and the other replaced with a tracked assembly as shown in second unit 220 (FIG. 2B) (providing a mixed propulsion system).

The unit further includes a fifth chassis 630 that is longer compared to the first chassis 210 of FIG. 2A. Thus, the third vehicle 600 can be understood to be substantially similar to first unit 200 of FIG. 2A, but for the extended chassis and the inclusion of a second wheeled assembly. In this case, third vehicle 600 provides a continuous upper surface which in this example is carrying a fourth object 660 as well as a fifth object 670. While fourth object 660 is a simple box, the fifth object 670 is far more bulky and cumbersome, and is better served by the continuity provided by a single elongated chassis than two (or more) separate chassis. A fifth control system 640 in this type of arrangement can communicate primarily with a remote operator, rather than with co-units.

Figure 7:
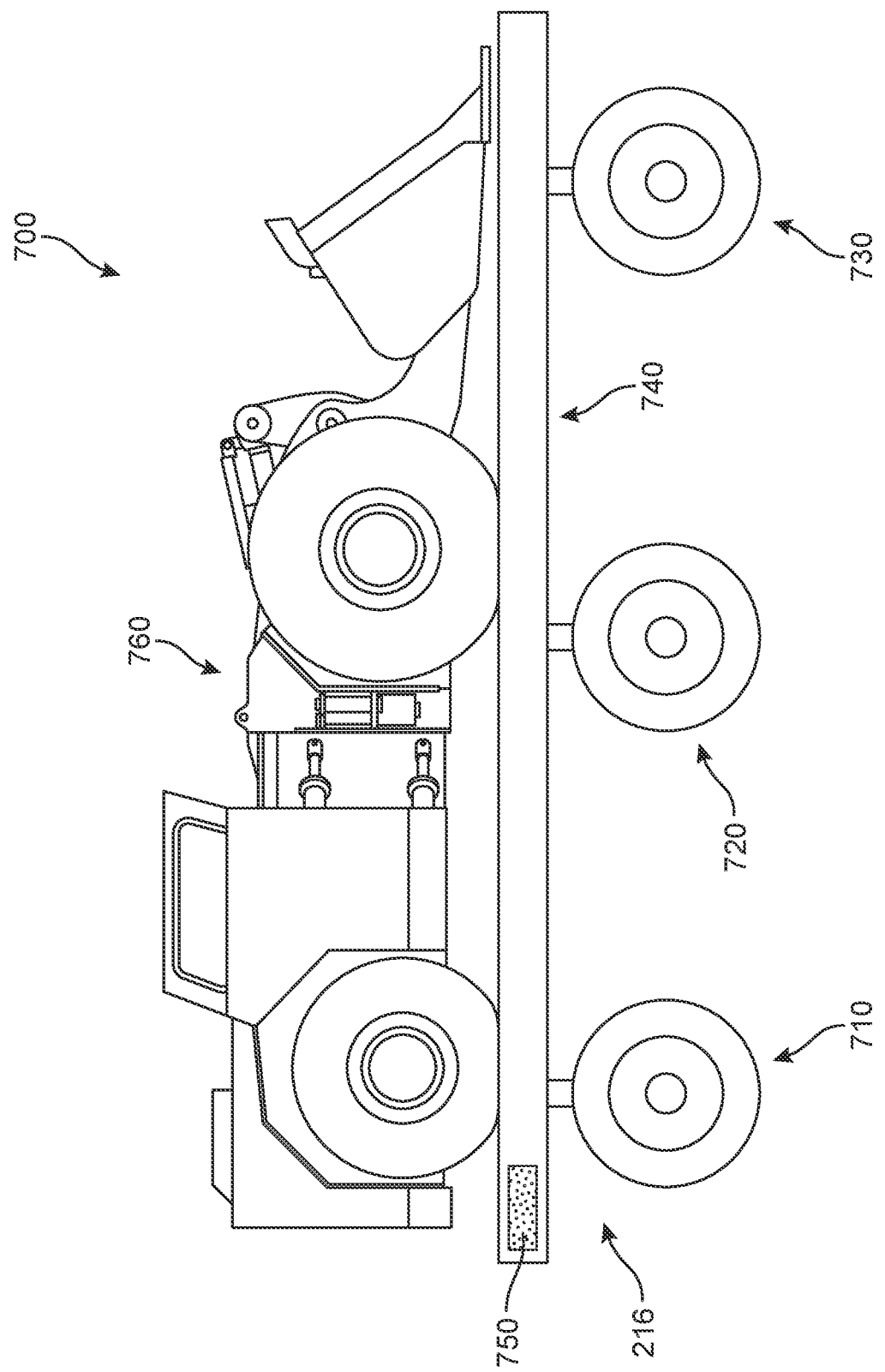
FIG. 7 is a side view of a fourth type of driverless vehicle system comprising a single autonomous wheeled vehicle with three axles, according to an embodiment.

In FIG. 7, another embodiment is presented in which a fourth autonomous vehicle ("fourth vehicle") 700 is depicted comprising a single vehicular unit with three wheeled assemblies, here shown as a third wheeled assembly 710, a fourth wheeled assembly 720, and a fifth wheeled assembly 730, each employing wheeled propulsion system 216. The third wheeled assembly 610 is disposed toward one end of the vehicle and the fifth wheeled assembly 730 is disposed toward the opposing end, with the fourth wheeled assembly 720 being disposed between the other two. However, in other examples, the three wheel sets may alternatively be replaced with three tracked assemblies as described with reference to second unit 220 in FIG. 2B, while in yet another example, one or two assemblies may correspond to the wheeled assembly of first unit 210 (FIG. 2A) and the other(s) replaced with a tracked assembly as shown in second unit 220 (FIG. 2B) (providing a mixed propulsion system).

The unit further includes a sixth chassis 740 that is longer compared to the first chassis 212 of FIG. 2A, being closer in length to fifth chassis 630 of FIG. 6. Thus, the fourth vehicle 700 can be understood to be substantially similar to first unit 210 of FIG. 2A, but for the extended chassis and the inclusion of a second and third wheeled assembly. In this case, fourth vehicle 700 provides a continuous upper surface which in this example is carrying a tractor 760. It can be appreciated that tractor 760 is a far heavier load than the load carried by third vehicle 600 in FIG. 6, and is better supported by the additional middle wheeled assembly. A sixth control system 750 in this type of arrangement can communicate primarily with a remote operator, rather than with co-units.

Figure 8:
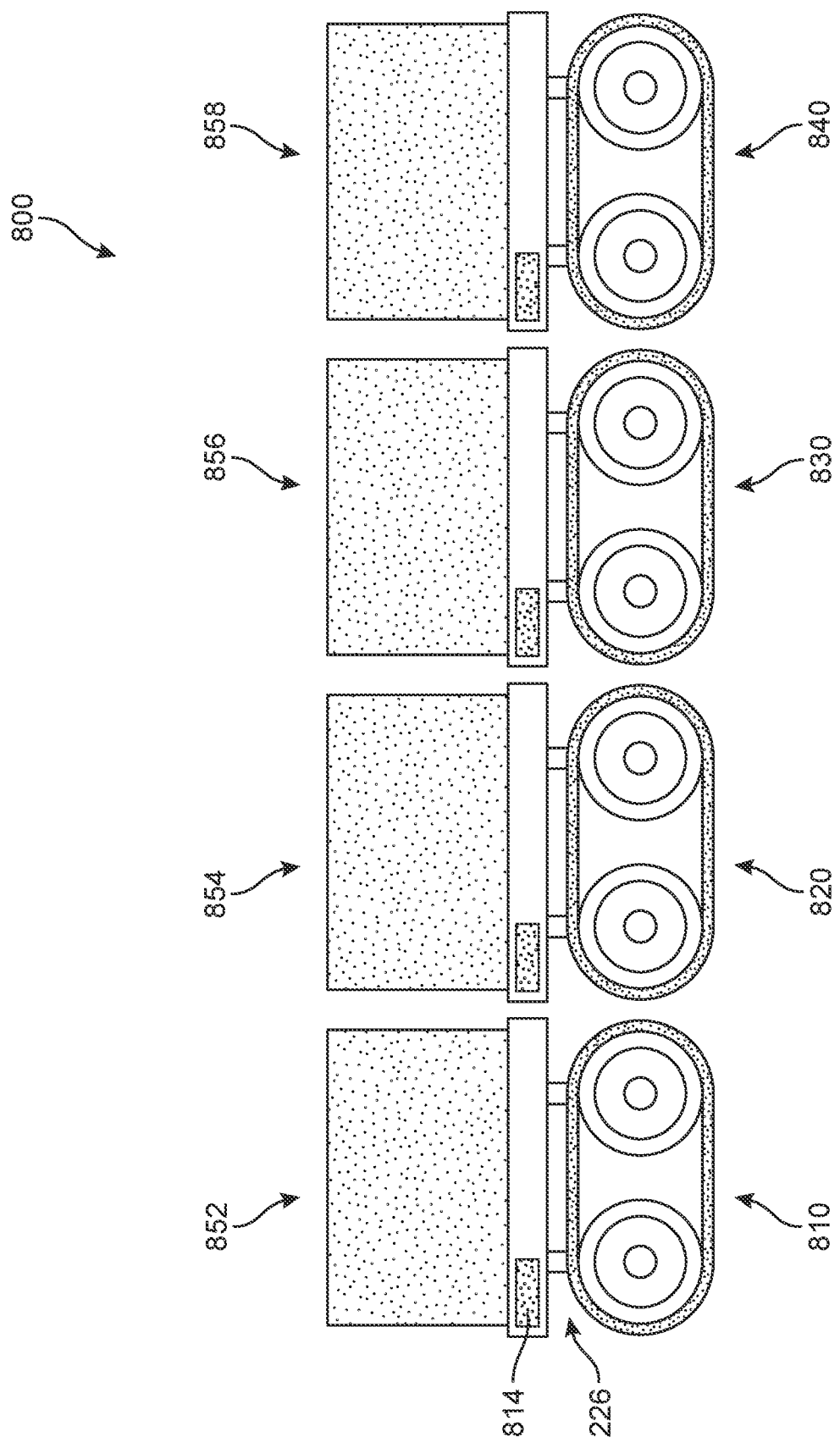
FIG. 8 is a side view of a fifth type of driverless vehicle system comprising four autonomous synchronized tracked vehicles, according to an embodiment.
Figure 9:
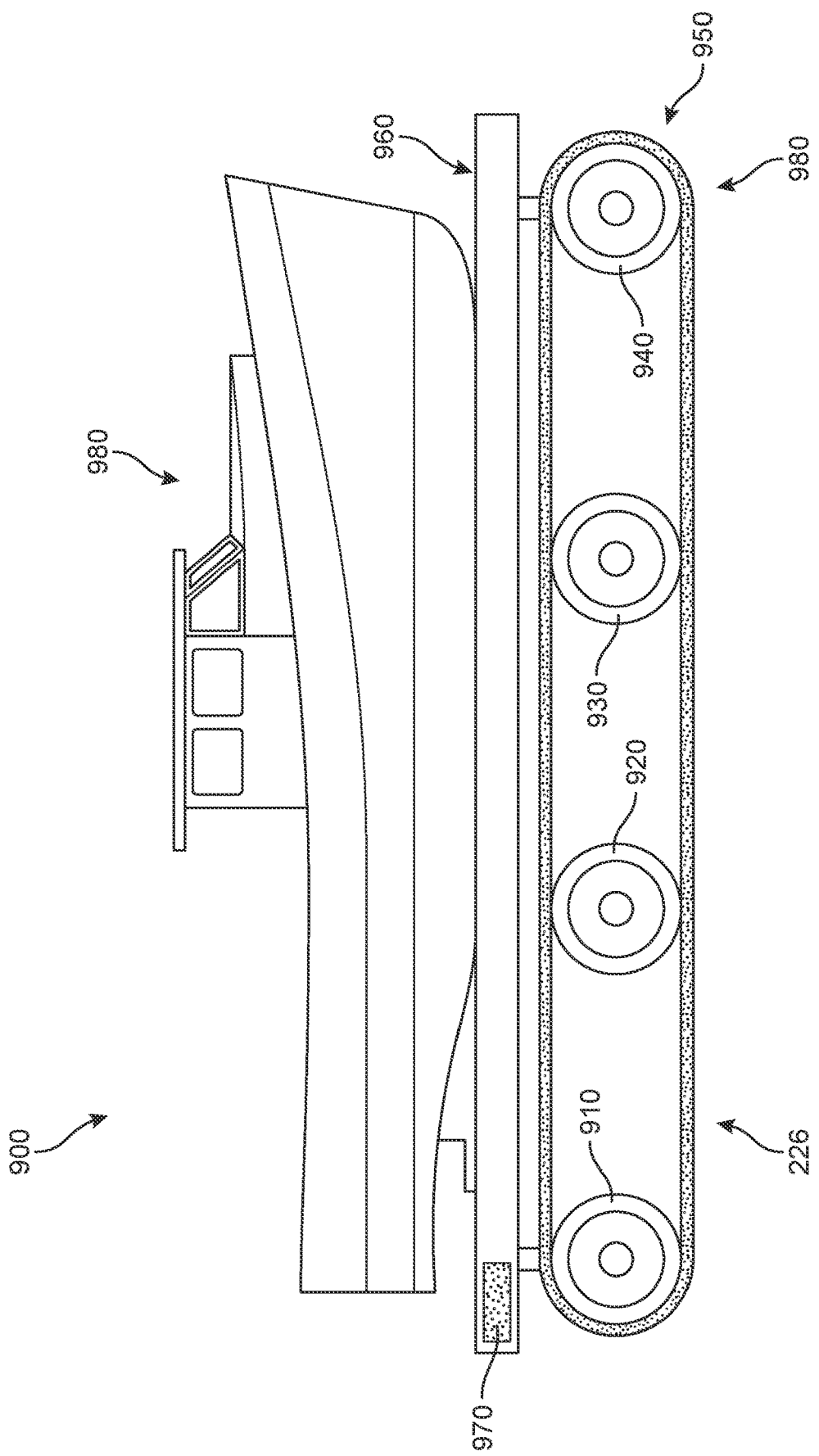
FIG. 9 is a side view of a sixth type of driverless vehicle system comprising a single autonomous tracked vehicle, according to an embodiment.

For purposes of illustration, additional embodiments including the tracked assembly as discussed earlier with respect to FIG. 2B are now presented in FIGS. 8 and 9. Referring now to FIG. 8, another embodiment is presented in which a fifth autonomous vehicle ("fifth vehicle") 800 is depicted comprising four vehicular units that are wirelessly linked. In other embodiments, the vehicular units can also or alternatively be mechanically linked, for example by hooks, trailers, and/or links, or other connecting mechanisms known in the art. All four of the units, here labeled as an eighth unit 810, a ninth unit 820, a tenth unit 830, and an eleventh unit 840, can be understood to correspond to the vehicular unit described above as second unit 220 shown in FIG. 2B (comprising the tracked propulsion system). In this case, each unit is spaced apart from a neighboring unit a substantially similar distance, providing a type of unit train. In different embodiments, each distance can vary widely, and be selected by the operator, as noted earlier.

In FIG. 8, each unit transports its own object, such that eighth unit 810 carries a sixth object 852, ninth unit 820 carries a seventh object 854, tenth unit 830 carries an eighth object 856, and eleventh unit 840 carries a ninth object 858. In some embodiments, this type of arrangement (four discrete units) can also be used to carry long loads like the first object 330 of FIG. 3 with the additional tracked assemblies and chassis offering greater support and distribution of weight. Furthermore, the tracked assemblies provide for a vehicle that is configured to carry multiple objects while performing in more unstable, irregular, or harsh conditions (e.g., snow, mud, rain, gravel, etc.). In addition, as described earlier, in order to operate synchronously, each of the four units has an independent control system (e.g., control system 814) that is configured to communicate with other units comprising the same vehicle, as well as process sensor data from one or more sensors installed in each chassis and transmit/receive data from a remote operator. In other embodiments, the vehicular units may also or alternatively serve as passive mechanical trailers, whereby the first vehicular unit is autonomous, and pulls one or more additional vehicular units behind it.

FIG. 9 presents another embodiment in which a sixth autonomous vehicle ("sixth vehicle") 900 is depicted comprising a single vehicular unit with a second tracked assembly 980. The second tracked assembly 980 includes a right track mechanism and a left track mechanism (only one track mechanism of the two track mechanisms is visible in this view) that support a seventh chassis 960 above a ground surface. In FIG. 9, each track mechanism includes a set of four wheels (here shown as 910, 920, 930, 940) that drive a continuous band 950, thereby employing tracked propulsion system 226.

The seventh chassis 960 is also longer compared to the second chassis 222 of FIG. 2B. Thus, the sixth vehicle 900 can be understood to be substantially similar to second unit

220 of FIG. 2B, but for the extended chassis and the inclusion of two longer track mechanisms. In this case, sixth vehicle 900 provides a continuous upper surface which in this example is carrying a boat 980. It can be appreciated that boat 980 is a far heavier load than the load carried by fifth vehicle 800 in FIG. 8, and is better supported by the additional middle wheels, as well as being ready for transport across uneven or harsh terrain. A seventh control system 970 in this type of arrangement can communicate primarily with a remote operator, rather than with co-units.

As noted earlier, AVs of the proposed embodiments are configured to readily facilitate the removal and installation of various modular components. In particular, in different embodiments, the chassis of any unit and/or AV as described herein can include features that facilitate the installation and removable of such components. For example, a chassis can be provided that is adapted to accommodate removable modular components, as well as include and one or more fastening mechanisms that are used to install and remove the modular component. In some embodiments, one or more mating or docking mechanisms can also be placed in corresponding locations on the chassis and/or on the modular component itself, such as a rod or bar that may be lifted up to connect the pieces together, grooves and holes for receiving portions of the component or chassis, wall, or other passive features. In some embodiments, the chassis can include handles, brackets, fixtures for mounting racks, retractable or foldable cages, or support pillars for optionally receiving components to mount elements such as lighting equipment, audio equipment, cargo storage racks, straps or tie-downs, rods or racks, cargo netting, brackets, thereby allowing various elements to be readily interchanged in and out of the vehicle. Any suitable mating mechanisms can be used that permit removal and reinstallation of a part. More specifically, in some embodiments, a chassis can include one or more rails, tracks, channels, holders, bars, rods, poles, etc. that are arranged around a periphery or outer perimeter of the chassis, and/or along the interior of the chassis. For example, a rail can be mounted on or integrally formed in the chassis in order to provide any number of attachment points for modular components such as a modular sidewall, as discussed below.

In some embodiments, the chassis can include one or more cavities or recesses formed in its upper surface to receive and mate with a specific modular component (e.g., a container bin, interior sidewalls, etc.). In some examples, the modular components can be used to create an array of storage compartments on the chassis itself. For example, a user may have specific type of cargo, ranging from small items, fragile items, large items, bulky items, loose items, sensitive items, etc. In one embodiment, modular platforms may be removably installed onto one or more chassis, providing a type of interchangeable base. Each platform can be configured with the docking or fastening mechanisms to accommodate other types of modular components or a particular type of cargo. In one example, a substantially thick first platform may be desired in cases where the cargo is unusually heavy, and later the first platform may be swapped out for a thinner, second platform suitable for lightweight items. In another example, a first platform with a first length may be installed, and later the first platform is swapped out for a second platform with a greater second length to provide enough surface space for more cargo or to accommodate the selected spacing or gap between units.

In other words, in different embodiments, the vehicles described herein can accommodate a wide range of changes in size, capacity, chassis height (relative to the ground), sidewalls, and propulsion. For example, in an autonomous vehicle with a wheeled propulsion system, a wheel assembly may be modular, allowing for the use of a different axle, wheel type, or wheel size. In some other embodiments, modular parts such as headlights, brake lights, signal lights, speakers, stereo systems, etc. may be available. Thus, depending on the modular component(s) used, the overall functioning and purpose of the autonomous vehicle can vary widely. Multiple vehicular units and other modular components or accessories may be obtained in a kit of parts to facilitate the interchangeability of the system.

Figure 10:
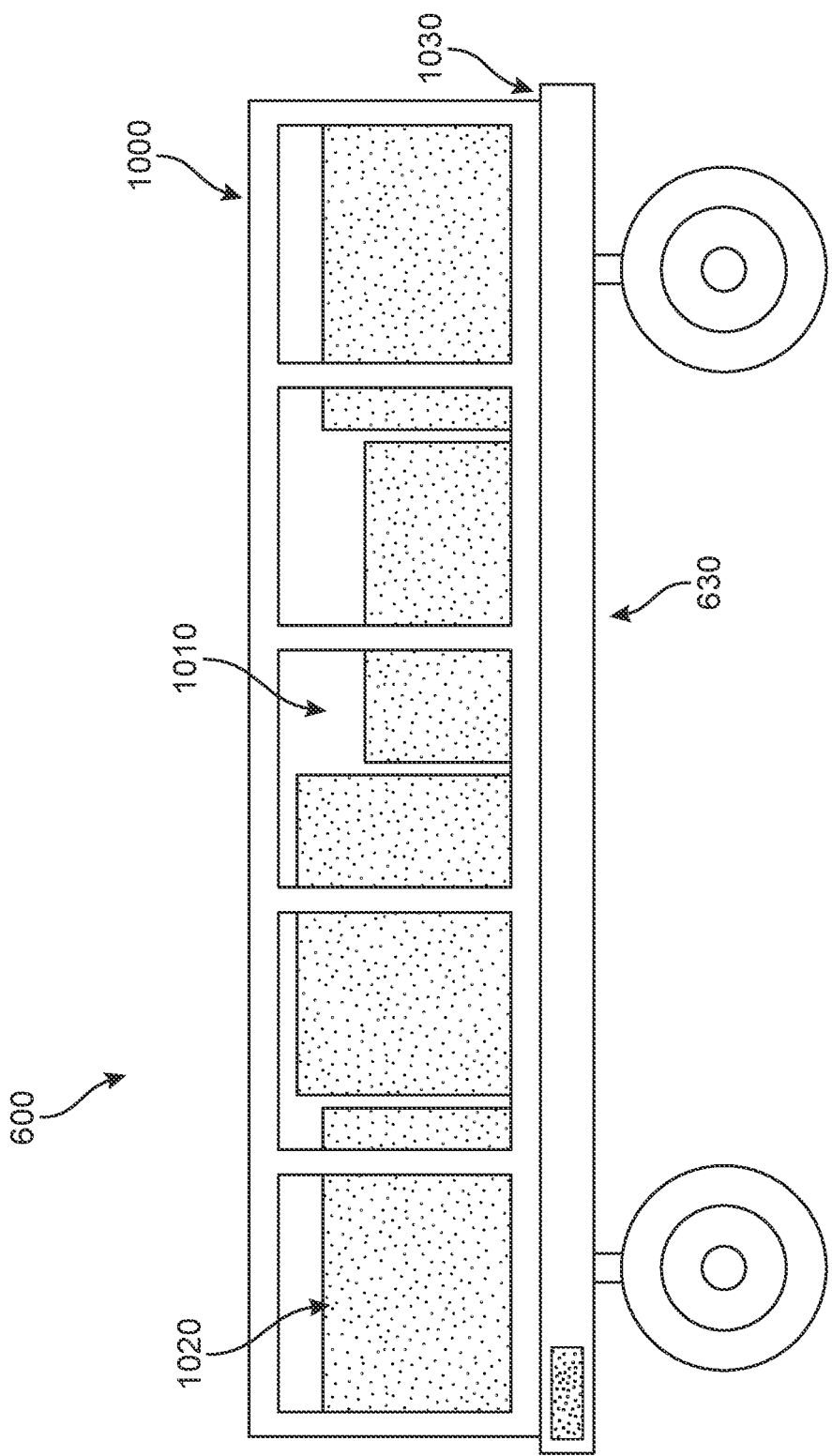
FIG. 10 is a side view of the third type of driverless vehicle system further including a first set of modular sidewalls, according to an embodiment.
Figure 11:
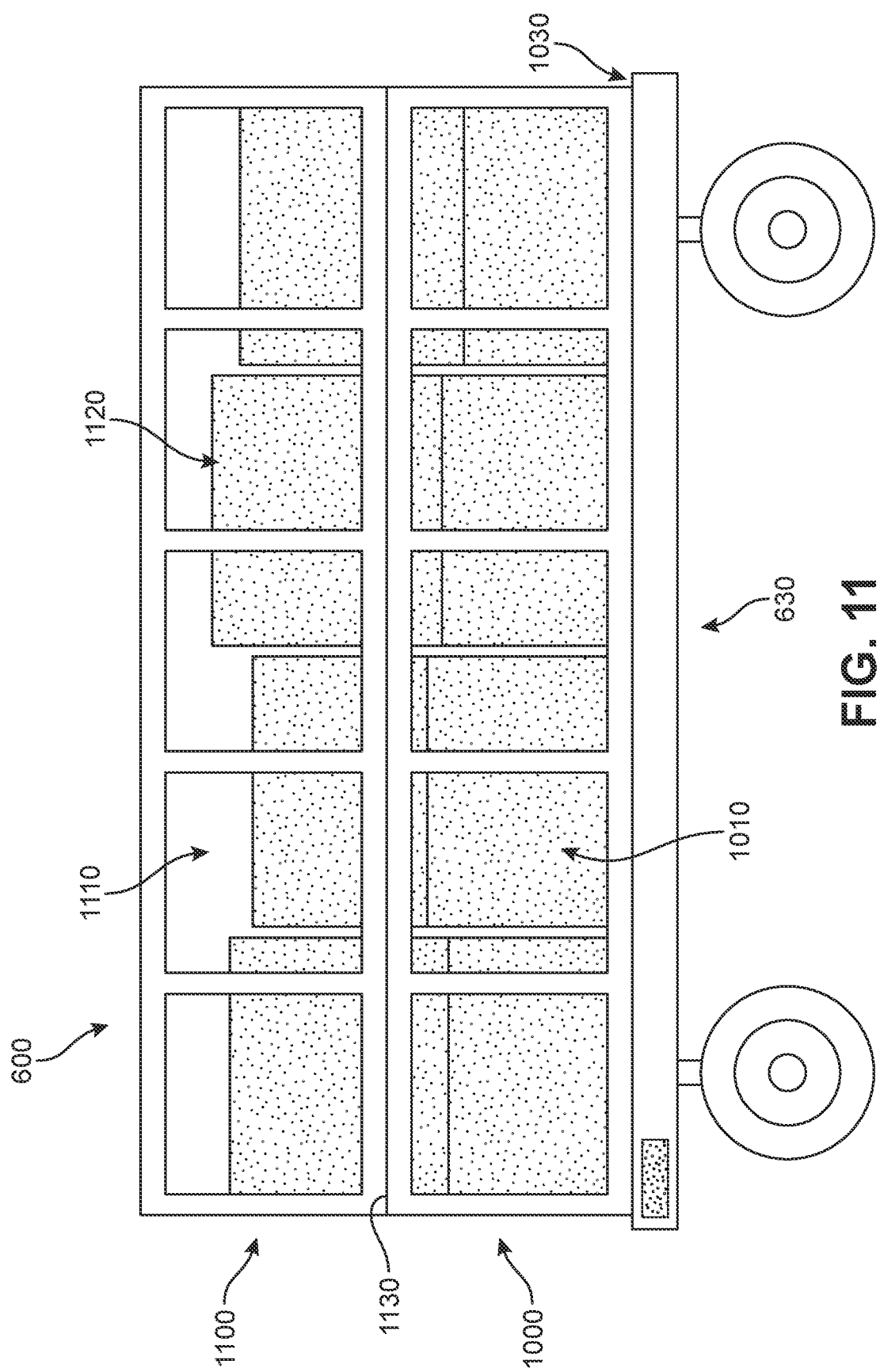
FIG. 11 is a side view of the third type of driverless vehicle system further including a first set and second set of modular sidewalls connected to extend along a vertical direction, according to an embodiment.
Figure 12:
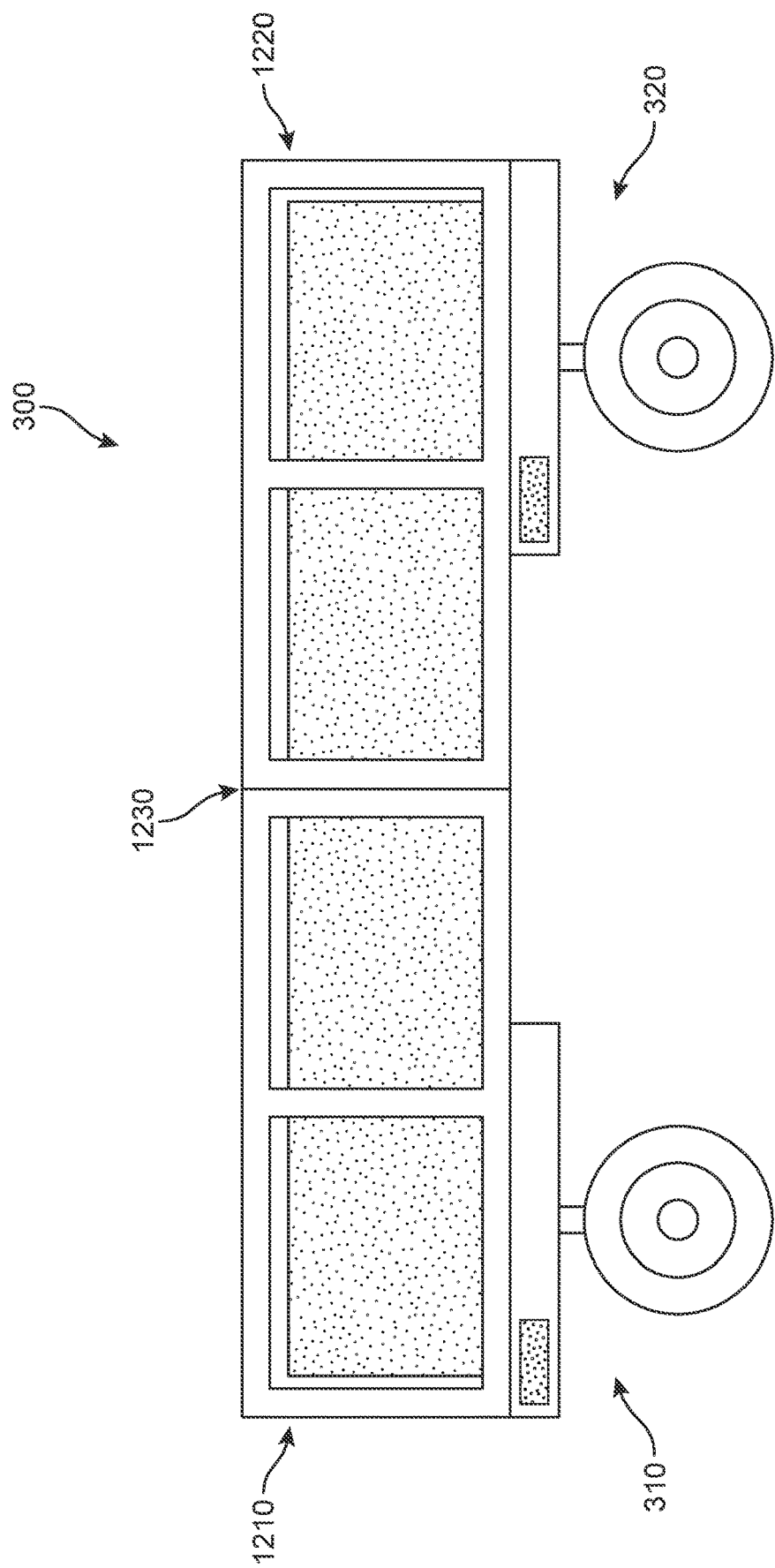
FIG. 12 is a side view of the third type of driverless vehicle system further including a first set and second set of modular sidewalls connected to extend along a horizontal direction, according to an embodiment.

As a more specific example, in some embodiments, modular sidewalls can be mounted or installed on a chassis for long-term or short-term use. Referring to FIGS. 10-12, some embodiments of a modular sidewall system are depicted. In FIG. 10, the third vehicle 600 is shown with a first modular sidewall ("first sidewall") 1000 installed on a first side of the first chassis 630 that extends roughly from a front wheel to a rear wheel. It can be understood that, in different embodiments, a separate second sidewall may also be installed on the opposing side, and additional sidewalls may be installed on the forward and rear sides of the chassis, forming a rectangular box with an open top that can serve as a secure, modular storage compartment. In some embodiments, the open top can also be closed off by the mounting of a fifth sidewall that fastens to the topmost edges of each of the four sidewalls disposed below, for example via any type of mechanical connector such as a hinge or strap, etc. In one embodiment, a chassis may include grooves for receiving a peripheral portion of a sidewall to simplify the mounting process. In different embodiments, each sidewall can be the same in height and/or width, or vary in dimensions from an adjacent sidewall. For example, one sidewall may have a first surface area that is larger than a second surface area of a different sidewall.

In different embodiments, the modular sidewalls can be substantially rigid (e.g., made of steel or other metals, hard plastics, etc.) or elastic (e.g., cargo netting stretched between one fastening mechanism of the chassis to another, textile sheets, plastic sheets, or a series of ropes, straps, rubber bands, etc.). While in some embodiments a modular sidewall may be substantially opaque, in other embodiments, the modular sidewall may include transparent or translucent portions such as plexiglass, plastic tarp or sheets, apertures, etc. that reveal aspects of the cargo disposed in an interior of the modular storage compartment. The sidewalls can be used to protect the cargo from external environmental conditions, help secure the cargo from theft (e.g., some of the fastening mechanisms can employ a lock that restricts the removal of the sidewalls to those with a key, code, or other security token), and/or prevent the cargo from falling off of the chassis or otherwise becoming unstable. In the example of FIG. 10, the first sidewall 1000 is a rigid wall that includes a first plurality of windows 1010 through which a first layer of cargo 1020 is visible.

In some embodiments, the cargo may be stacked in order to transport a greater number of objects. In such cases, stability becomes increasingly important. Referring to FIG. 11, it can be seen that in some examples, a modular sidewall may be fastened to another modular sidewall to build a 'taller' wall. More specifically, a second modular sidewall ("second sidewall") 1100 has been disposed atop of an upper edge of the first sidewall 1000 and locked together along a mechanical seam or first connection region 1130. The connection mechanism can vary, but as a non-limiting example can include the insertion of rods that are slid through channels formed along a side of each sidewall that can be aligned with one another. The second sidewall 1100 also includes a second plurality of windows 1120 that reveal another layer of cargo 1110 stacked atop of the first layer of cargo 1010. Although only two modular sidewalls are shown in FIG. 11, it should be understood that, depending on the type of sidewalls installed, any number of sidewalls can be interconnected to form parts of a compartment or enclosure of a wide range of sizes and volume. Thus, a chassis may receive no sidewall, one sidewall, or multiple sidewalls along each of its four sides. Each sidewall is easily removable and can be interchangeable for installation on other types of chassis.

In different embodiments, modular components may also be installed in embodiments where the AV comprises multiple units, and therefore multiple chassis. With respect to sidewalls, in some embodiments, the same arrangement as discussed above in FIGS. 10 and 11 may be applied to such multi-unit vehicles. For example, in the case of a two-unit vehicle, a sidewall can be installed that extends along a side of a first chassis, extends across the gap between the two chassis, and extends along a side of the second chassis. The fastening mechanisms can be provided between the sidewall and the chassis sides, and the middle region of the sidewall can be floating or unlocked. In some embodiments, multiple modular sidewalls can be connected to one another not only in the vertical direction but in the horizontal direction. As an example, as shown in FIG. 12, the first vehicle 300 can be equipped with a sidewall system comprising two sidewalls that are interconnected along edges of each sidewall aligned with a vertical axis. More specifically, a third sidewall 1210 is joined to a fourth sidewall 1220 along a seam or second connection region 1230. The third sidewall 1210 is mounted atop third unit 310 and the fourth sidewall 1220 is mounted atop of fourth unit 320, and the intersection between the two forms a mechanical bridge or connection between the two units, and can, with the inclusion of a modular platform disposed atop the upper surface of both chassis, be used to form a single compartment for cargo storage.

Figure 13:
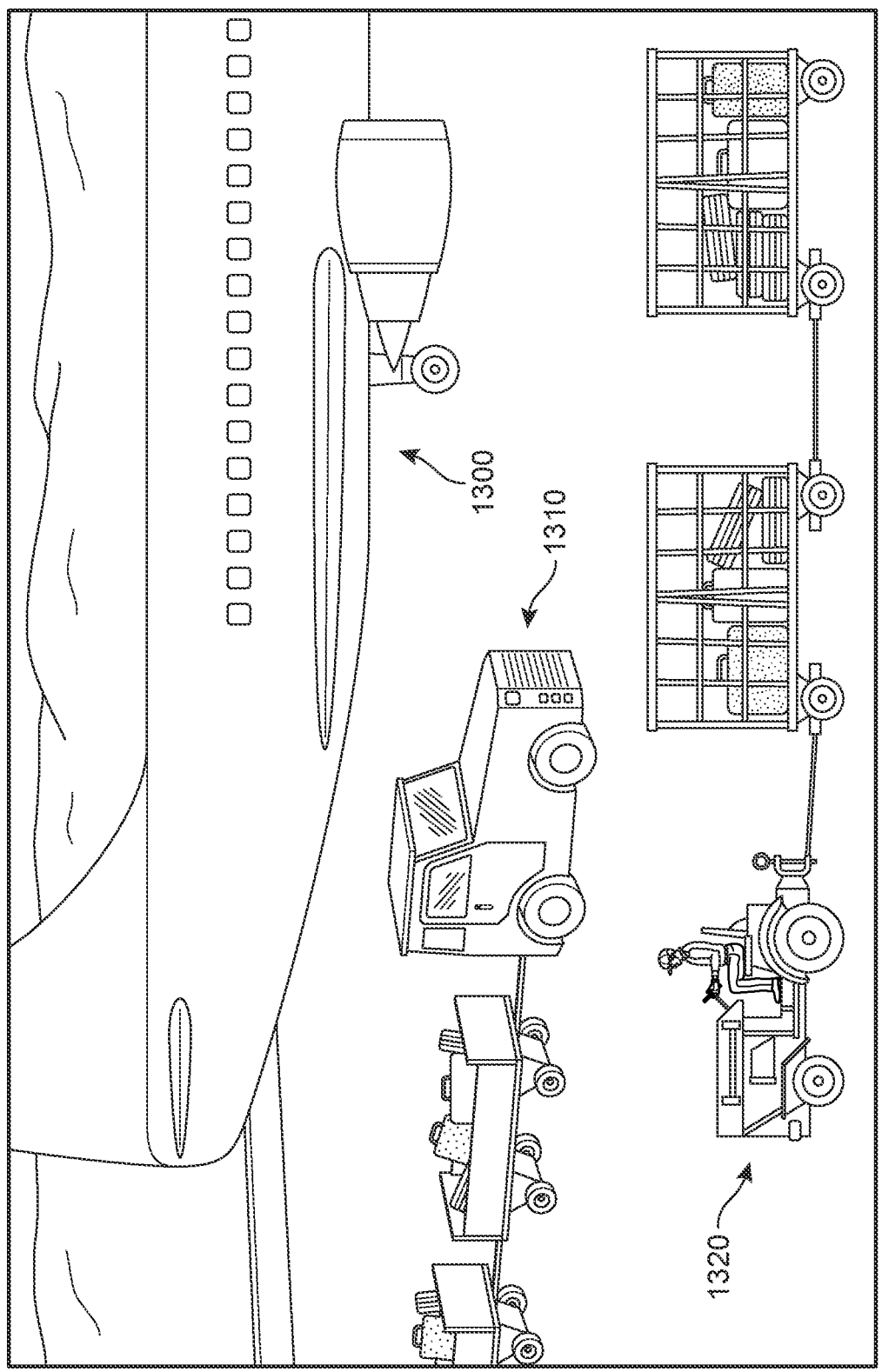
FIG. 13 is an illustration of a conventional airport baggage handling operation.
Figure 14:
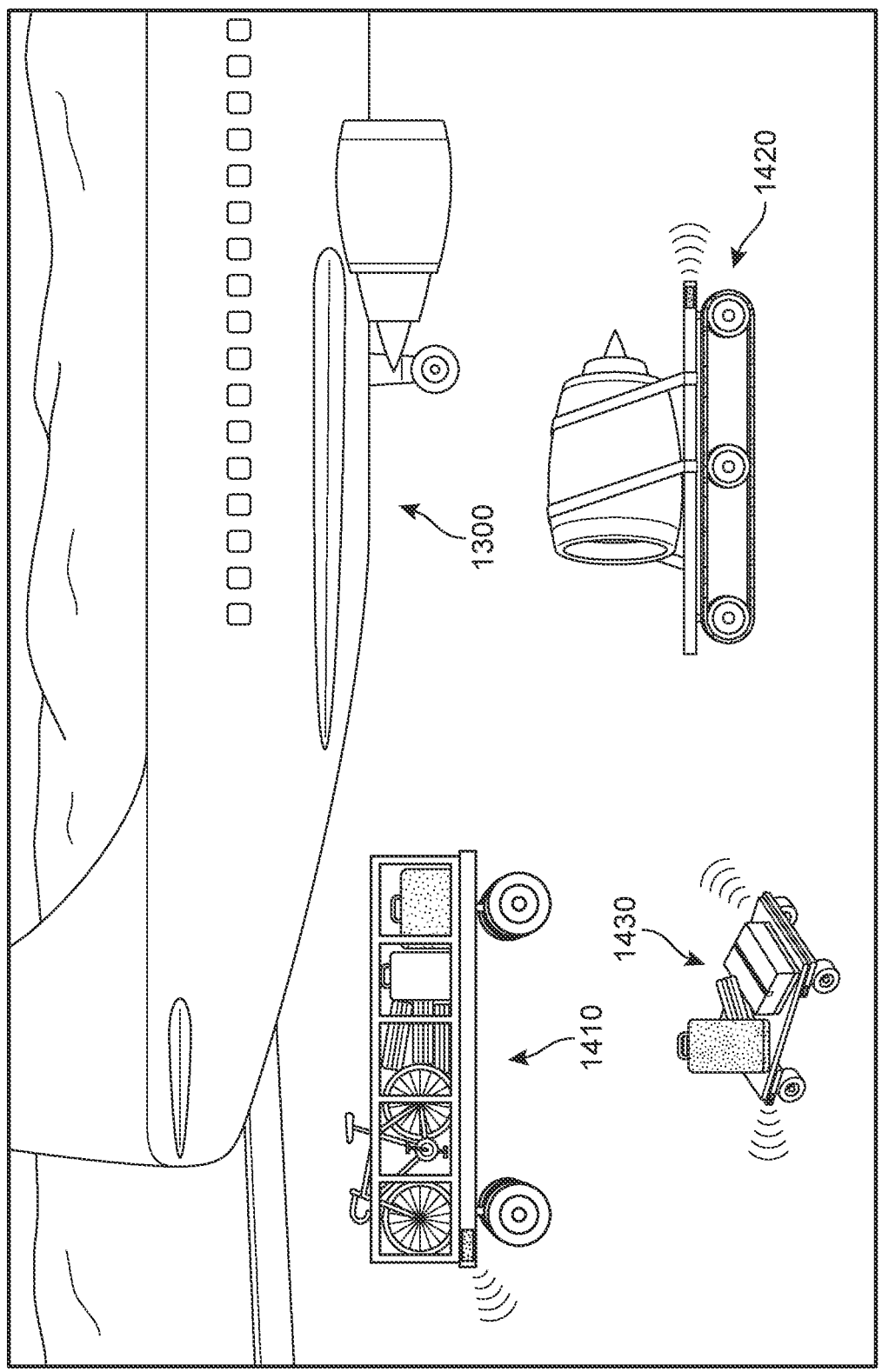
FIG. 14 is an illustration of an example of an autonomous vehicle system providing automated airport baggage handling services, according to an embodiment.

For purposes of illustration, FIGS. 13 and 14 present an example of an application of some of the proposed embodiments. FIG. 13 depicts a logistical site such as an airport 1300 in which a conventional transport system comprising manually operated vehicles such as luggage train 1310 and a tractor line 1320 are used to transport goods. Such a system must ensure the safety of human drivers, coordinate human movement, track transport schedules that can be affected by human delays and errors, and provide for fuel and maintenance of a separate vehicle that simply moves passive carts. Each cart, being passive, if disabled, can cause disruption of the entire train of cargo. These human operated vehicles are also shared across a large number of users, increasing the transmission of disease.

In contrast, FIG. 14 depicts the airport 1300 in which an autonomous vehicle system is employed. In this example, three AVs are shown, including a luggage AV 1410 that includes a wheeled propulsion system and a set of modular sidewalls, an equipment AV 1420 that includes a tracked propulsion system and a set of straps connected to the chassis to secure an aircraft engine, and a parcels AV 1430 that includes two units with a modular platform removably mounted atop of the two chassis to carry a set of parcels. The three vehicles, being autonomous, have no drivers, and can operate independently to deliver their cargo to their destination. They can also wirelessly inter-communicate in order to ensure no collisions occur. In some embodiments, in cases where an AV comprises a train of units (e.g., FIGS. 5 and 8), if one unit fails, the remaining units can rearrange themselves to continue delivery of their cargo, while the failed unit awaits repair. In embodiments where the unit is an electric-powered vehicle that needs to be charged, the unit can either travel to a charging dock, or have its exhausted modular battery exchanged for a fresh modular battery.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A modular driverless vehicle system comprising:
   a first autonomous vehicular unit including:
      a first chassis with a wheeled propulsion system including a first number of axles,
      a first sensor, and
      a first control unit;
   a second autonomous vehicular unit that is discrete and separate from the first vehicular unit and includes:
      a second chassis with a tracked propulsion system including a second number of axles that is different from the first number,
      a second sensor, and
      a second control unit that is configured to wirelessly receive data from both the first sensor and the second sensor in order to synchronize operations of the second vehicular unit with operations of the first vehicular unit;
   a first modular sidewall mounted atop a first side of the first chassis and a second modular sidewall mounted along an upper edge of the first modular sidewall to form a taller interconnected sidewall; and
   wherein the first vehicular unit and second vehicular unit are configured to:
      operate synchronously such that they operate at generally the same speed at the same time in the same direction without a mechanical connection,
      maintain stable, steady motion relative to one another, and automatically maintain a substantially constant distance between each other during operation, the first autonomous vehicular unit and the second autonomous vehicular unit thereby collectively operating as a single autonomous vehicle entity with a mixed propulsion system.

2. The system of claim 1, further comprising:
a third modular sidewall removably mounted atop a second side of the first chassis;
a fourth modular sidewall that is larger than the third modular sidewall removably mounted on a third side of the second chassis; and
wherein the third modular sidewall is interchangeable with the fourth modular sidewall, such that the fourth modular sidewall may be removably mounted on the second side of the first chassis and the third modular sidewall may be removably mounted on the third side of the second chassis.

3. The system of claim 1, wherein the first control unit further includes a communications module configured to receive commands from a remote operator.

4. The system of claim 1, wherein the first sensor comprises one of a camera, radar, proximity sensor, and infrared sensor.

5. The system of claim 1, wherein the first control unit and the second control unit are configured to communicate wirelessly with one another in order for the first autonomous vehicular unit and second autonomous vehicular unit to operate synchronously.

6. The system of claim 1, further comprising a first platform with a first end and a second end, the first end being removably mounted on the first chassis and the second end being removably mounted on the second chassis.

7. The system of claim 1, further comprising a plurality of modular sidewalls that can be removably mounted on either or both of the first chassis or the second chassis to form an enclosed structure.

8. The system of claim 1, wherein the first control unit further includes a navigation module that accesses a global navigation satellite system (GNSS) in order to allow the first autonomous vehicular unit to derive a route from its current position to a destination.

9. The system of claim 1, wherein a LIDAR sensor that measures scattered light with respect to irradiation light and measures a distance to a target is attached to a front of the first chassis.

10. The system of claim 1, wherein the first control unit further includes a storage module that includes road information and traffic regulations information.

11. A kit of parts comprising:
a first autonomous vehicle comprising a first chassis with at least a first wheeled assembly and a first control unit, the first chassis including a first number of axles;
a second autonomous vehicle that is discrete and separate from the first autonomous vehicle comprising a second chassis with a first tracked assembly and a second control unit, the second chassis including a second number of axles that is different from the first number; and
a first sidewall that is configured to be removably fastened to either or both of the first chassis or the second chassis,
wherein the first autonomous vehicular unit and second autonomous vehicular unit are configured to operate synchronously as a single autonomous vehicle entity with a mixed propulsion system such that they operate at generally the same speed at the same time in the same direction without a mechanical connection.

12. The kit of claim 11, wherein the first chassis includes a first battery storage receptacle, the second chassis includes a second battery storage receptacle, and each of the first battery storage receptacle and second battery storage receptacle are configured to receive and connect to a rechargeable battery.

13. The kit of claim 11, further comprising a second sidewall, wherein the second sidewall has a larger surface area than the first sidewall, and the second sidewall is configured to be removably fastened to either or both of the first chassis or the second chassis.

14. The kit of claim 13, further comprising a first platform that is configured to be removably fastened to either or both of the first chassis or the second chassis.

15. The kit of claim 14, further comprising a second platform that is configured to be removably fastened to either or both of the first chassis or the second chassis, the second platform has a thickness that differs from a thickness of the first platform.

16. An autonomous modular vehicle system comprising:
a first vehicular unit comprising a first chassis with a first propulsion system, a first number of axles, and a first control unit configured to communicate with a remote operator; and
a second vehicular unit comprising a second chassis with a second propulsion system that differs from the first propulsion system and a second number of axles that differs from the first number, and a second control unit configured to communicate to communicate with a remote operator;
wherein the first control unit and the second control unit are configured to communicate wirelessly with one another to maintain a substantially constant distance between each other during operation.

17. The system of claim 16, wherein the first vehicular unit is configured to navigate in a free manner without human support based on sensor data acquired by one or more sensor(s) and processed in the first control unit to generate control signals for the first propulsion system.

18. The system of claim 16, further comprising a plurality of modular sidewalls that can be removably mounted onto the first chassis to form an enclosed structure.

19. The first vehicular unit of claim 16, wherein the first propulsion system includes a first wheeled assembly.

20. The first vehicular unit of claim 16, wherein the first propulsion system includes a first tracked assembly.

* * * * *